United States Patent Office 3,726,893
Patented Apr. 10, 1973

3,726,893
2-(p-PHENYLBENZYL)OXAZOLINES
Ying-Ho Chen and Carl Dalton Lunsford, Richmond, Va., assignors to A. H. Robins Company, Incorporated, Richmond, Va.
No Drawing. Continuation-in-part of abandoned application Ser. No. 82,159, Oct. 19, 1970. This application Sept. 9, 1971, Ser. No. 179,237
Int. Cl. C07d 85/36
U.S. Cl. 260—307 F                6 Claims

ABSTRACT OF THE DISCLOSURE

Novel 2-(p-phenylbenzyl)oxazolines of the formula:

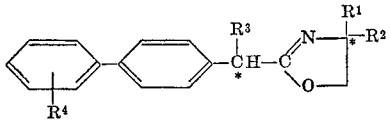

wherein $R^1$ and $R^2$ are selected from the group consisting of hydrogen, lower-alkyl and hydroxylower-alkyl, $R^3$ is selected from the group consisting of hydrogen and lower-alkyl, and $R^4$ is selected from the group consisting of hydrogen, fluorine, bromine, chlorine and trifluoromethyl are prepared by reacting p-phenylphenylacetic acids with aminoalcohols under dehydrating conditions. The novel products of the structural formula set forth hereinabove have anti-inflammatory activity. The asterisks serve to point out asymmetric carbon atoms present in some of the novel compounds.

---

This application is a continuation-in-part of copending application Ser. No. 82,159, filed Oct. 19, 1970, now abandoned.

The present invention relates to anti-inflammatory agents and is more particularly concerned with certain 2-(p-phenylbenzyl)oxazolines which possess a high degree of anti-inflammatory activity, the preparation thereof, therapeutic compositions containing said oxazolines as active ingredient and a method of use of said compounds and compositions to alleviate inflammation and symptoms thereof in a living animal body.

The anti-inflammatory agents of the present invention are preferably compounds having the formula:

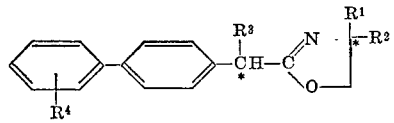

Formula I wherein:

$R^1$ and $R^2$ are hydrogen, lower-alkyl and hydroxylower-alkyl, $R^3$ is hydrogen and lower-alkyl, and $R^4$ is hydrogen, fluorine, bromine, chlorine and trifluoromethyl.

In the structural formula given above, the asterisks (*) serve to point out the asymmetric carbon atoms present in many of the compounds of the present invention, for example, when $R^1$ and $R^2$ are dissimilar. When two asymmetric centers are present, pairs of diastereoisomers are possible. These diastereoisomers, together with their optically active forms, are included within the scope of the present invention.

The novel compounds of the present invention at 316 mg./kg. (per os) reduced the response to pleural irritation. The anti-inflammatory action of the novel compounds was demonstrated using a modification of the Evans Blue-Carrageenan Pleural Effusion test [Sancilio, L. F., Journal of Pharmacology and Experimental Therapeutics 168, pp. 199–204 (1969)]. The potency of the most active compounds are set forth in Table I. The potencies were determined relative to phenylbutazone, the standard anti-inflammatory agent.

TABLE I
Potency of oxazolines relative to phenylbutazone

| Example | Potency [1] | 95% confidence limits |
|---|---|---|
| Phenylbutazone | 1 | |
| 1 | 0.9 | 0.56–1.38 |
| 3 | 1.9 | 0.61–5.28 |
| 7 | 1.5 | 0.9–2.8 |
| 12 | 3.8 | |
| 13 | 4.3 | 4.1–5.24 |

[1] The data was obtained using doses of 50, 10 and 2 mg./kg. per os.

TABLE II
Activity of oxazolines in the six-hour Evans blue-carrageenan pleural effusion assay

| Example | Dose [1] | Percent reduction |
|---|---|---|
| 2 | 316 | 37.8 |
| 4 | 316 | 32.4 |
| 6 | 316 | 49.2 |
| 8 | 50 | 31.8 |
|   | 10 | 13.4 |
| 9 | 50 | 31.8 |
|   | 10 | 11.9 |
| 10 | 50 | 37.5 |
| 11 | 316 | 23 |
| 15 | 316 | 38 |

[1] Mg./kg. per os.

It is, accordingly, an object of the present invention to provide novel compounds which have a high degree of anti-inflammatory activity. An additional object is the provision of compounds having anti-inflammatory activity and which produce minimal side effects.

Another object is to provide certain novel 2-(p-phenylbenzyl)oxazolines. A still further object is to provide therapeutic compositions containing the same and methods for the utilization thereof. Other objects of this invention will be apparent to one skilled in the art and still other objects will become apparent hereinafter.

In the definition of symbols in the foregoing Formula I and where they appear elsewhere throughout this specification the terms have the following significance.

The term "lower-alkyl" as used herein includes straight and branched chain radicals of up to eight carbon atoms inclusive and is exemplified by such groups as methyl, ethyl, propyl, isopropyl, butyl, tertiary butyl, amyl, hexyl, octyl, and the like.

The p-phenylphenylacetic acids starting materials and the aminoalcohols used in the present invention are either commercially available or they can be prepared by methods well known to the art.

METHOD OF PREPARATION

The preparation of the 2-(p-phenylbenzyl)oxazolines (I) may be accomplished by mixing and reacting a p-phenylphenylacetic acid (II) with an aminoalcohol (III). The reaction sequence is illustrated by the following:

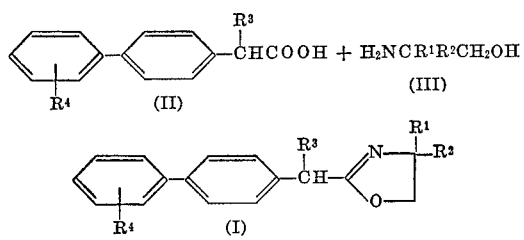

wherein $R^1$, $R^2$, $R^3$ and $R^4$ have the values give hereinabove.

A general procedure for the preparation of the 2-(p-phenylbenzyl)oxazoline (I) is as follows:

A stirred mixture of one part of a p-phenylphenylacetic acid (II), one and one-tenth parts of an aminoalcohol (III) and 500 parts of a water immiscible organic solvent such as benzene, toluene, xylene, Tetralin, phenyl ether and the like is refluxed in a system containing a water trap for a period of from about four hours to about four days during which period the water formed during the reaction is separated in the trap. After the theoretical amount of water has separated, the hot reaction mixture is filtered and the oxazoline (I) is isolated from the filtrate by a suitable procedure. When at least one of the substituents in the 4-position of the oxazoline ring is hydroxymethyl, the product separates from the cooled filtrate as a well-defined crystalline material. When one or both substituents in the 4-position are lower-alkyl radicals, the product is usually a low melting solid which is isolated by concentration of the filtrate and distillation in vacuo of the residue to give the oxazoline which crystallizes on standing.

Optically active oxazolines are readily prepared as described hereinabove by using optically active aminoalcohols as starting materials. Examples 8 and 9 in Table III were prepared using optically active aminoalcohols.

The oxazolines can also be prepared by cyclization of α-(p-phenylphenyl)-N-substituted acetamides in a dehydrating medium as described hereinabove. The acetamides which are usually well-defined crystalline solids are prepared by reacting p-phenylphenylacetyl halides with aminoalcohols in a suitable solvent.

The following examples are given by way of illustration and are not limiting.

EXAMPLE 1

2-(p-phenylbenzyl)-4-hydroxymethyl-4-methyloxazoline

A solution of 32.0 g. (0.15 mole) of p-phenylphenylacetic acid and 17.5 g. (0.17 mole) of 2-amino-2-methyl-1,3-propanediol in 600 ml. of xylene was refluxed overnight using a Dean-Stark trap during which time the theoretical amount of water separated. The reaction mixture was filtered while hot and the filtrate was cooled to room temperature. The white crystals which formed on standing were separated by filtration and washed with water on the filter until the filtrate was of neutral pH. Recrystallization of the solid from xylene gave 25 g. (59.5%) of product which melted at 116–118° C.

*Analysis.*—Calculated for $C_{18}H_{19}NO_2$ (percent): C, 76.84; H, 6.81;; N, 4.98. Found (percent): C, 77.14; H, 6.77; N, 4.91.

EXAMPLE 2

2-(p-phenylbenzyl)-4-bis-hydroxymethyloxazoline

A solution of 5.1 g. (0.025 mole) of p-phenylphenylacetic acid and 4.0 g. (0.033 mole) of tris(hydroxymethyl)methylamine in 300 ml. of xylene was refluxed 12 hours using a Dean-Stark trap. The hot reaction mixture was filtered and the product which separated from the cooled filtrate was collected and washed with water until the washings were neutral. The white crystalline product was recrystallized from acetone-ethanol to give 6 g. (81%) of product which melted at 160–161° C.

*Analysis.*—Calculated for $C_{18}H_{19}NO_3$ (percent): C, 72.70; H, 6.44; N, 4.71. Found (percent): C, 72.66; H, 6.14; N, 4.73.

EXAMPLE 3

2-(p-phenylbenzyl)-4,4-dimethyloxazoline

Using the procedure of Example 1, p - phenylphenylacetic acid and 2 - amino - 2 - methyl - 1 - propanol were reacted together in refluxing xylene to give 2-(biphenyl-4-ylmethyl)-4,4-dimethyloxazoline (M.P. 54–56° C.) in 87.7% yield.

*Analysis.*—Calculated for $C_{18}H_{19}NO$ (percent): C, 81.47; H, 7.22; N, 5.28. Found (percent): C, 81.31; H, 7.22; N, 5.31.

EXAMPLE 4

2-[p-(4-fluorophenyl)benzyl]-4-hydroxymethyl-4-methyloxazoline

Using the procedure of Example 1, p-(4-fluorophenyl)phenylacetic acid and 2-amino-2-methyl-1,3-propanediol were reacted together in refluxing xylene to give a 48.4% yield of 2 - (4' - fluorobiphenyl-4-ylmethyl)-4-hydroxymethyl-4-methyloxazoline which melted at 105–107° C.

*Analysis.*—Calculated for $C_{18}H_{18}NO_2F$ (percent): C, 72.22; H, 6.06; N, 4.68. Found (percent): C, 72.07; H, 6.08; N, 4.74.

EXAMPLE 5

2-(p-phenylbenzyl)oxazoline

Using the procedure of Example 1, p-phenylphenylacetic acid and 2-aminoethanol are reacted together in refluxing xylene to give 2 - (biphenyl-4-ylmethyl)oxazoline.

EXAMPLES 6–18

Examples 6–18 were prepared using the procedure of Example 1. The physical data are summarized in Table III.

TABLE III

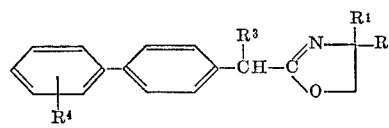

| Example | $R_1$ | $R_2$ | $R_3$ | $R_4$ | (B.P.) M.P., °C./mm. | Calcd. C | Calcd. H | Calcd. N | Found C | Found H | Found N |
|---|---|---|---|---|---|---|---|---|---|---|---|
| 6 | $CH_3$ | $CH_3$ | H | p-F | 59–61 | 76.30 | 6.40 | 4.94 | 76.12 | 6.43 | 4.61 |
| 7 | $CH_3$ | H | H | H | 53.55 | 81.24 | 6.82 | 5.57 | 81.20 | 6.83 | 5.55 |
| 8 [a] | $CH_3$ | H | H | H | 52–54.5 | 81.24 | 6.81 | 5.57 | 80.86 | 6.87 | 5.42 |
| 9 [b] | $CH_3$ | H | H | H | | 81.24 | 6.82 | 5.57 | 81.06 | 6.91 | 5.08 |
| 10 | $C_2H_5$ | H | H | H | 36–38 | 81.47 | 7.22 | 5.28 | 80.78 | 7.25 | 5.27 |
| 11 | $(C_3H)_2CH$ | H | H | H | (160-2/.01) | 81.17 | 7.57 | 5.26 | 81.04 | 7.57 | 5.04 |
| 12 | $CH_3$ | $CH_3$ | $CH_3$ | H | 55–57 | 81.39 | 7.59 | 4.61 | 81.48 | 7.22 | 5.28 |
| 13 | $CH_3$ | H | $CH_3$ | H | (140-5/.05) | 81.48 | 7.22 | 5.28 | 80.38 | 7.24 | 5.12 |
| 14 | $CH_2OH$ | $CH_3$ | $CH_3$ | H | 67–69 | 72.82 | 7.39 | 4.46 | 73.53 | 7.03 | 4.47 |
| 15 | $CH_2OH$ | $CH_3$ | H | M-Cl | 113–115 | 68.46 | 5.74 | 4.43 | 68.17 | 5.79 | 4.55 |
| 16 | $CH_3$ | H | H | p-F | (124-6/0.1) | 76.30 | 6.40 | 4.94 | 75.81 | 6.21 | 4.78 |
| 17 | $CH_3$ | $CH_3$ | H | m-F | | | | 4.93 | | | 5.05 |
| 18 | $CH_3$ | $CH_3$ | H | m-Cl | | | | 4.67 | | | 4.53 |

[a] d-Isomer prepared using d-2-amino-1-propanol.
[b] l-Isomer prepared using l-2-amino-1-propanol.

EXAMPLE 19

When, in the procedure of Example 1, there is substituted for p-phenylphenylacetic acid an equivalent amount of the following:

p-(3-trifluoromethylphenyl)phenylacetic acid,
p-(3-bromophenyl)phenylacetic acid, and
p-(4-bromophenyl)phenylacetic acid, there are obtained 2-[p-(3-trifluoromethylphenyl)benzoyl]-4-hydroxymethyl-4-methyloxazoline.
2-[p-(3-bromophenyl)benzyl]-4-hydroxymethyl-4-methyloxazoline, and
2-[p-(4-bromophenyl)benzyl]-4-hydroxymethyl-4-methyloxazoline.

FORMULATION AND ADMINISTRATION

The present invention also contemplates novel compositions containing the compounds of the invention as active ingredients. In forming the novel compositions of this invention, the active ingredient is incorporated in a suitable carrier, illustratively, a pharmaceutical carrier. Suitable pharmaceutical carriers which are useful in formulating the compositions of this invention include starch, gelatin, glucose, magnesium carbonate, lactose, malt and the like. Liquid compositions are also within the purview of this invention and suitable liquid pharmaceutical carriers include ethyl alcohol, propylene glycol, glycerine, glucose syrup and the like.

Although small quantities of the active materials of the present invention are effective when minor therapy is involved or in cases of administration to subjects having a relatively low body weight, unit dosages are fifty or one hundred milligrams. Fifty to 100 milligrams appear to be optimum per unit dose, while usual broader ranges appear to be 50 to 300 milligrams per unit dose.

The following are examples of compositions formed in accordance with this invention.

(1) Capsules

Capsules of 50 mg. and 100 mg. of active ingredient per capsule are prepared.

Typical blend for encapsulation:   Per capsule, mg.
    Active ingredient _____ 50.0
    Lactose _____ 251.7
    Starch _____ 129.0
    Magnesium stearate _____ 4.3

Total _____ 435.0

Additional capsule formulations preferably contain a higher dosage of active ingredient and are as follows:

Ingredients:                      100 mg. per capsule
    Active ingredient _____ 100.0
    Lactose _____ 231.5
    Starch _____ 99.2
    Magnesium stearate _____ 4.3

Total _____ 435.0

In each case, uniformly blend the selected active ingredient with lactose, starch, and magnesium stearate and encapsulate the blend.

(2) Tablets

A typical formulation for a tablet containing 50.0 mg. of active ingredients per tablet follows. The formulation may be used for other strengths of active ingredient by adjustment of weight of dicalcium phosphate.

Per tablet, mg.
(1) Active ingredient _____ 50.0
(2) Milo starch _____ 20.0
(3) Corn starch (paste) _____ 38.0
(4) Lactose _____ 90.0
(5) Calcium stearate _____ 2.0

Total _____ 200.0

Uniformly blend the active ingredient, lactose, milo starch and the corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

100 mg. tablet
Ingredients:                       Per tablet, mg.
    Active ingredient _____ 100.0
    Lactose _____ 190.0
    Dicalcium phosphate _____ 172.2
    Starch _____ 54.0
    Milo starch _____ 21.6
    Calcium stearate _____ 2.2

Total _____ 540.0

Uniformly blend the active ingredient, lactose, dicalcium phosphate, starch and milo starch. This blend is granulated with water and the wet mass is passed through a number eight mesh screen. The wet granules are dried at 140-160 degrees Fahrenheit overnight. The dried granules are passed through a number ten mesh screen. These dried granules are blended with the proper weight of calcium stearate and the lubricated granules are then converted into tablets on a suitable tablet press.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What we claim is:

1. A compound selected from 2-(p-phenylbenzyl)oxazolines having the formula:

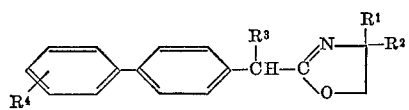

wherein:
$R^1$ and $R^2$ are each selected from the group consisting of hydrogen, lower-alkyl and hydroxymethyl,
$R^3$ is selected from the group consisting of hydrogen and lower-alkyl, and
$R^4$ is selected from the group consisting of hydrogen, fluorine, bromine, chlorine and trifluoromethyl.

2. A compound as defined in claim 1 which is 2-(p-phenylbenzyl)-4-hydroxymethyl-4-methyloxazoline.

3. A compound as defined in claim 1 which is 2-(p-phenylbenzyl)-4-methyloxazoline.

4. A compound as defined in claim 1 which is 2-(p-phenylbenzyl)-4,4-dimethyloxazoline.

5. A compound as defined in claim 1 which is 2-[p-phenyl-(α-methyl)benzyl]-4,4-dimethyloxazoline.

6. A compound as defined in claim 1 which is 2-[p-phenyl-(α-methyl)benzyl]-4-methyloxazoline.

References Cited

UNITED STATES PATENTS 3,235,557   2/1966   Wiggins et al. _____ 260—307

RAYMOND V. RUSH, Primary Examiner

U.S. Cl. X.R.

424—272